United States Patent [19]

Hasegawa

[11] Patent Number: 5,781,358
[45] Date of Patent: Jul. 14, 1998

[54] MAGNETIC RECORDING APPARATUS WITH NON-LINEAR BIT SHIFT MEASUREMENT

[75] Inventor: Toshiyuki Hasegawa, Tokyo, Japan

[73] Assignee: NEC Corporation, Japan

[21] Appl. No.: 690,127

[22] Filed: Jul. 31, 1996

[30] Foreign Application Priority Data

Jul. 31, 1995 [JP] Japan ................... 7-194673

[51] Int. Cl.$^6$ ................................ G11B 5/09
[52] U.S. Cl. ..................... 360/51; 360/40; 360/31
[58] Field of Search .................. 360/45, 31, 25, 360/26, 40; 341/52

[56] References Cited

U.S. PATENT DOCUMENTS 5,262,904  11/1993  Tang et al. ................... 360/45

FOREIGN PATENT DOCUMENTS

4-30305   2/1992  Japan.
4-295670  10/1992  Japan.

*Primary Examiner*—Aristotelis M. Psitos
*Assistant Examiner*—Alan Faber
*Attorney, Agent, or Firm*—Hayes, Soloway, Hennessey, Grossman & Hage, P.C.

[57] ABSTRACT

A magnetic recording apparatus includes a generator, a write unit, a read unit, a detector, and a processor. The generator generates a composite data pattern of a basic period having a central adjacent bit pair between isolated bits and an isolated data pattern having the same basic period as that of the composite data pattern and only an isolated bit. The write unit writes the composite and isolated data patterns generated by the generator on a magnetic recording medium. The read unit reads out the composite and isolated data patterns written on the magnetic recording medium. The detector detects phases of frequency components of the composite and isolated data patterns read out by the read unit. The processor converts a difference between the phases of the frequency components of the composite and isolated data patterns, detected by the detector, into a nonlinear bit shift compensation factor.

8 Claims, 6 Drawing Sheets

MAGNETIC RECORDING APPARATUS WITH NON-LINEAR BIT SHIFT MEASUREMENT

BACKGROUND OF THE INVENTION

1. Field of the Invention

The present invention relates to a magnetic recording apparatus.

In a magnetic recording apparatus, when pieces of signal information are recorded in a very close state, the pieces of signal information interfere with each other so as to shift the bit positions (referred to as a nonlinear bit shift hereinafter). This shift degrades detection performance of signal information in the magnetic recording apparatus.

2. Brief Description of Related Prior Art

In one prior art device, bit positions are shifted in advance prior to recording of signal information to compensate for the influence of the nonlinear bit shift. It is difficult to measure the magnitude of the nonlinear bit shift and, the influence of the nonlinear bit shift is compensated for without knowing its magnitude (see, e.g., Japanese Patent Laid-Open No. 4-030305).

Another prior art device proposes a method of measuring the magnitude of a nonlinear bit shift and compensating for the influence of the nonlinear bit shift in accordance with the measured magnitude (see, e.g., Japanese Patent Laid-Open No. 4-295670). This method assumes the use of a specific data pattern. When signal information is written without any nonlinear bit shift, the data pattern has no predetermined harmonic amplitude. When a given data pulse is shifted by a nonlinear bit shift, a predetermined harmonic which has had no amplitude without any nonlinear bit shift appears again and exhibits a given amplitude. The given amplitude of the harmonic represents the magnitude of the nonlinear bit shift.

Since the prior art for measuring the magnitude of the nonlinear bit shift from the amplitude of the predetermined harmonic in use of the specific data pattern employs the above technique, a large nonlinear bit shift results in a large amplitude of harmonic appearing again. This nonlinear bit shift can thus be easily measured.

When the nonlinear bit shift becomes small however, the amplitude of harmonic appearing again becomes small. When the nonlinear bit shift further decreases, predetermined harmonic is concealed in various noise components. It is therefore impossible to easily measure nonlinear bit shift.

The data pulse of a specific data pattern must be shifted by a known amount in order to determine the direction of nonlinear bit shift. Therefore, the direction of the nonlinear bit shift cannot be easily measured.

SUMMARY OF THE INVENTION

It is an object of the present invention to provide a magnetic recording apparatus capable of easily measuring the magnitude and direction of a nonlinear bit shift.

It is another object of the present invention to provide a magnetic recording apparatus capable of properly measuring even a small nonlinear bit shift.

In order to achieve the above objects of the present invention, there is provided a magnetic recording apparatus comprising generation means for generating a composite data pattern of a basic period having a central adjacent bit pair between isolated bits and an isolated data pattern having the same basic period as that of the composite data pattern and only an isolated bit, writing means for writing the composite and isolated data patterns generated by the generation means on a magnetic recording medium, reading means for reading out the composite and isolated data patterns written on the magnetic recording medium, detection means for detecting phases of frequency components of the composite and isolated data patterns read out by the reading means, and processing means for converting a difference between the phases of the frequency components of the composite and isolated data patterns, detected by the detection means, into a nonlinear bit shift compensation factor.

DESCRIPTION OF THE PREFERRED EMBODIMENT

Figure 1:
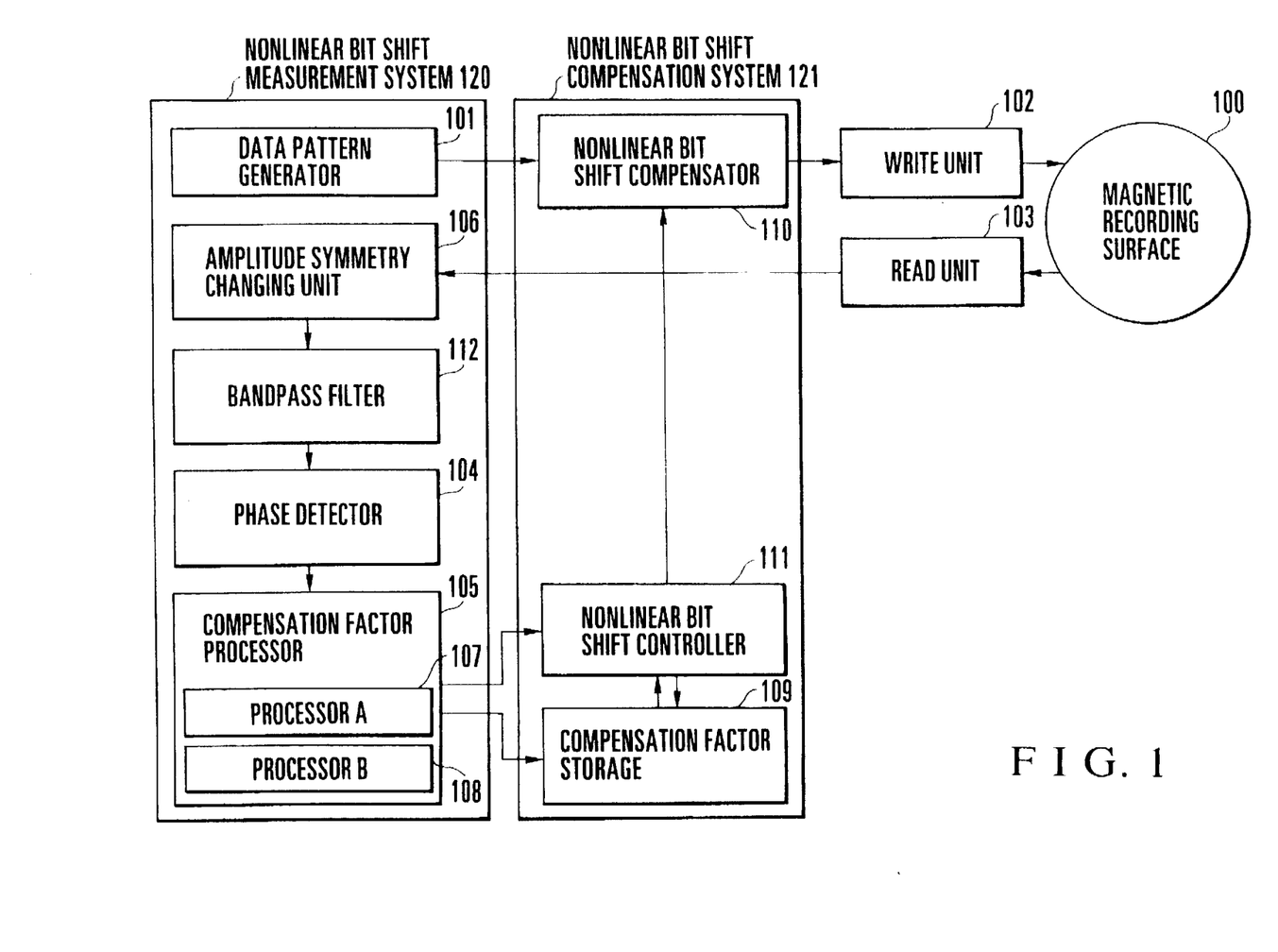
FIG. 1 is a block diagram showing a magnetic recording apparatus according to an embodiment of the present invention.

One embodiment of the present invention will be described with reference to the accompanying drawings. FIG. 1 shows a magnetic recording apparatus according to one embodiment of the present invention.

Figure 2A:
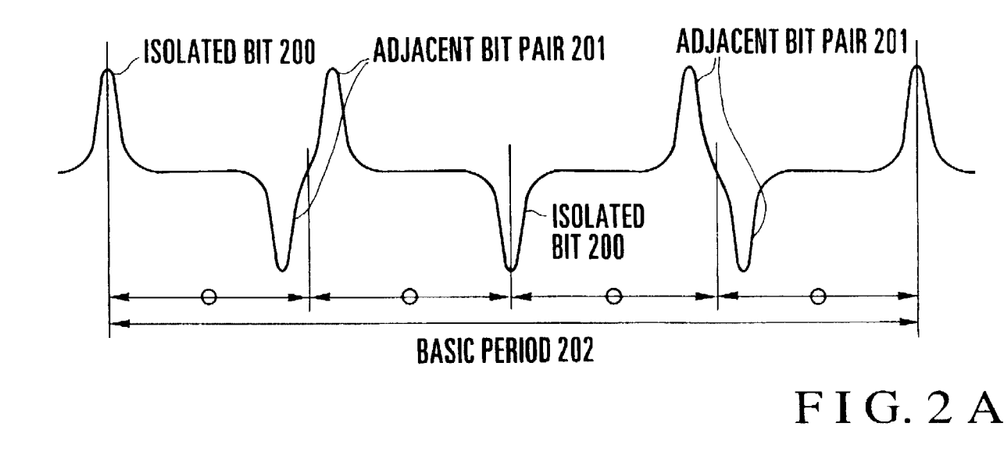
FIG. 2A is a schematic view showing a readout composite data pattern.
Figure 2B:
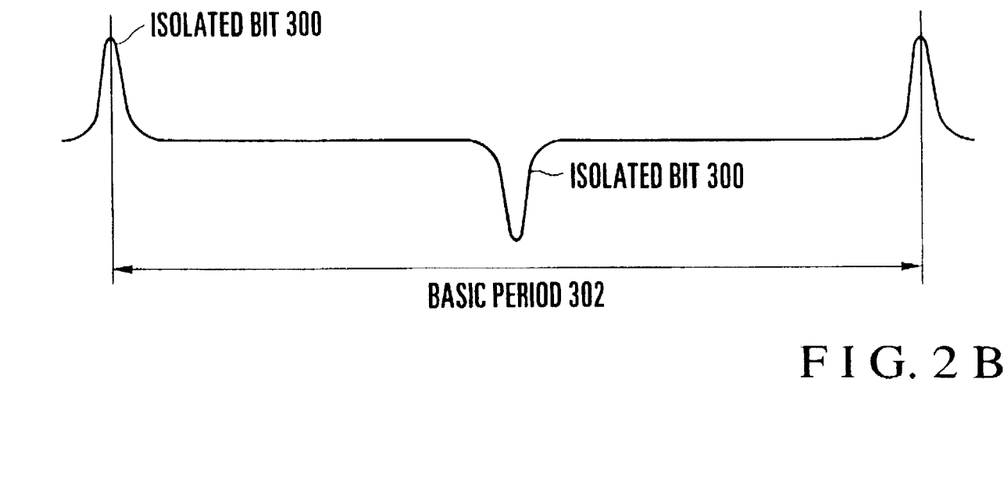
FIG. 2B is a schematic view of a readout isolated data pattern.

Referring to FIG. 1, the magnetic recording apparatus of this embodiment of the present invention is an apparatus for recording/reproducing a data pattern on/from a magnetic recording surface 100. The apparatus comprises data pattern generator 101, write unit 102, read unit 103, phase detector 104, and compensation factor processor (to be referred to as a processor hereinafter) 105. The data pattern generator 101 generates a composite data pattern. The composite data pattern has a central adjacent bit pair 201 between periodic isolated bits 200, and a basic period 202, as shown in FIG. 2A. The data pattern generator 101 also generates an isolated data pattern. The isolated data pattern has only a periodic isolated bit 300 and a basic period 302 identical to the basic pattern 202 of the composite data pattern, as shown in FIG. 2B. The write unit 102 writes the data patterns generated by the data pattern generator 101 on the magnetic recording surface 100 of a magnetic recording medium. The read unit 103 reads out the composite and isolated data patterns written on the magnetic recording surface 100 by the write unit 102. The phase detector 104 measures the phases of frequency components of the composite and isolated data patterns read out from the magnetic recording surface 100 by the read unit 103. The processor 105 converts the phase difference between the frequency components of the composite and isolated data patterns measured by the phase detector 104 into a nonlinear bit shift compensation factor.

The magnetic recording apparatus also includes an amplitude symmetry changing unit (referred to as a changing unit hereinafter) 106 for changing, by a known amount, the asymmetry in amplitude between the composite and isolated data patterns read out by the read unit 103.

The magnetic recording apparatus further includes processor A 107 and processor B 108 for converting the phase differences between the composite and isolated data patterns into nonlinear bit shift compensation factors $\Theta(4N)$ and $\Theta(4N-2)$ in accordance with equation (1) below using the phase (as the phase measured by the phase detector 104) of a frequency component 4N (N=1, 2, or 3) times the fundamental frequency of the composite and isolated data patterns, and equation (2) below using the phase (as the phase measured by the phase detector 104) of a frequency component 4N-2 (N=1, 2, or 3) times the fundamental frequency of the composite and isolated data patterns, which equations (1) and (2) one set forth below:

$$\Phi(4N)=\Psi(4N)-\Theta(4N) \quad (1)$$

where $\Psi(4N)$ is the phase of a harmonic having a frequency 4N times the fundamental frequency of the composite data pattern, and $\Theta(4N)$ is the phase of a harmonic having a frequency 4N times the fundamental frequency of the isolated data pattern; and $$\Phi(4N-2)=\Psi(4N-2)-\Theta(4N-2)\pm180 \quad (2)$$

where $\Psi(4N-2)$ is the phase of a harmonic having a frequency 4N-2 times the fundamental frequency of the composite data pattern, $\Theta(4N-2)$ is the phase of a harmonic having a frequency 4N-2 times the fundamental frequency of the isolated data pattern, and the signs (±) indicate that the nonlinear bit shift compensation factor $\Phi(4N-2)$ having a smaller absolute value is selected.

The magnetic recording apparatus also includes a bandpass filter 112 for extracting a frequency component in multiples of two of the fundamental frequency as a frequency component of the data pattern read out by the read unit 103.

Since the magnetic recording apparatus of the present invention comprises the above units, the nonlinear bit shift can be measured. The above units constitute a nonlinear bit shift measurement system 120.

The magnetic recording apparatus of the present invention includes a compensation factor memory (referred to as a memory hereinafter) 109, a nonlinear bit shift compensator 110, and a nonlinear bit shift controller (to be referred to as a controller) 111. The memory 109 updates and stores the nonlinear bit shift compensation factors. The compensator 110 shifts the position of the data pulse of the composite data pattern by a known amount in accordance with the nonlinear bit shift compensation factor. The controller 111 compares the nonlinear bit shift compensation factor of the composite data pattern written on the magnetic recording surface 100 by the write unit 102 upon compensation by the compensator 110 and read out by the read unit 103 with the nonlinear bit shift compensation factor stored before compensation in the memory 109, and controls the compensator 110 so as to minimize the nonlinear bit shift compensation factor.

The magnetic recording apparatus of the present invention uses the memory 109, compensator 110, and controller 111 to compensate for the nonlinear bit shift. These components constitute a nonlinear bit shift compensation system 121.

I. Arrangement of Composite Data Pattern

In the composite data pattern having the central adjacent bit pair 201 between the isolated bits 200 shown in FIG. 2A, the bit length of the adjacent bit pair 201 is for measuring influence of nonlinear bit shift. The bit length of the isolated bits 200 is determined sufficiently to neglect the influence of the nonlinear bit shift in the isolated bits 200 and adjacent bit pair 201. In this embodiment, the bit length of the isolated bits 200 is set 21 times that of the adjacent bit pair 201. The bit length of the isolated bits 200 determines the basic period 202 of a readout data pattern.

When the adjacent bit pair 201 subjected to a nonlinear bit shift upon writing a data pattern on the magnetic recording surface 100, the phases of the harmonic components of the readout data patterns change, respectively. In particular, in the composite pattern having the central adjacent bit pair 201 between the isolated bits 200, as shown in FIG. 2A, the phases of the harmonic components in multiples of two of the fundamental frequency change almost in proportion to the nonlinear bit shift of the adjacent bit pair 201. This will be described later with reference to the accompanying drawings.

II. Arrangement of Isolated Data Pattern

The basic period 302 shown in FIG. 2B is identical to the basic period 202 of the composite data pattern. A phase without any nonlinear bit shift, i.e., the origin can be measured in the isolated data pattern having only the isolated bit 300. In particular, phase differences between the composite and isolated data patterns free from the nonlinear bit shifts for the harmonic component having a frequency 4N (N=1, 2, or 3) times the fundamental frequency and the harmonic component having a frequency 4N-2 (N=1, 2, or 3) times the fundamental frequency become 0° and 180°, respectively. This will be described in detail later with reference to the accompanying drawings.

An example of the relationship between the nonlinear bit shifts of amplitudes and the phase differences between harmonic components in multiples of two of the fundamental frequency will be described below.

III. Relationship Between Phase Difference and Nonlinear Bit Shift

An example of the relationship between the nonlinear bit shift and the phase difference between the harmonic components of the composite and isolated data patterns will be explained. More specifically, FIG. 3 shows the relationship between the nonlinear bit shift and the phase difference between the composite and isolated data patterns having the harmonic components twice the fundamental frequency, and FIG. 4 shows the relationship between the nonlinear bit shift and the phase difference between the composite and isolated data patterns having the harmonic components four times the fundamental frequency.

Figure 3:
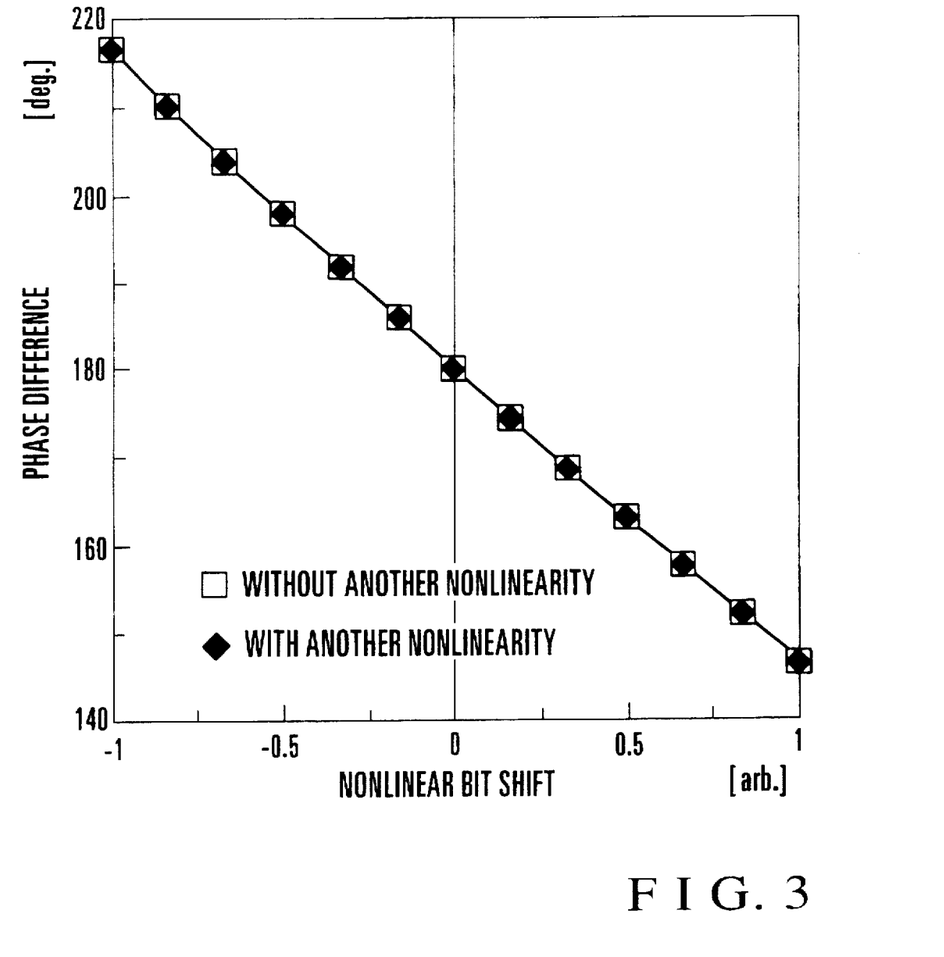
FIG. 3 is a graph showing the relationship between the nonlinear bit shift and the phase difference between second harmonic components of composite and isolated data patterns.
Figure 4:
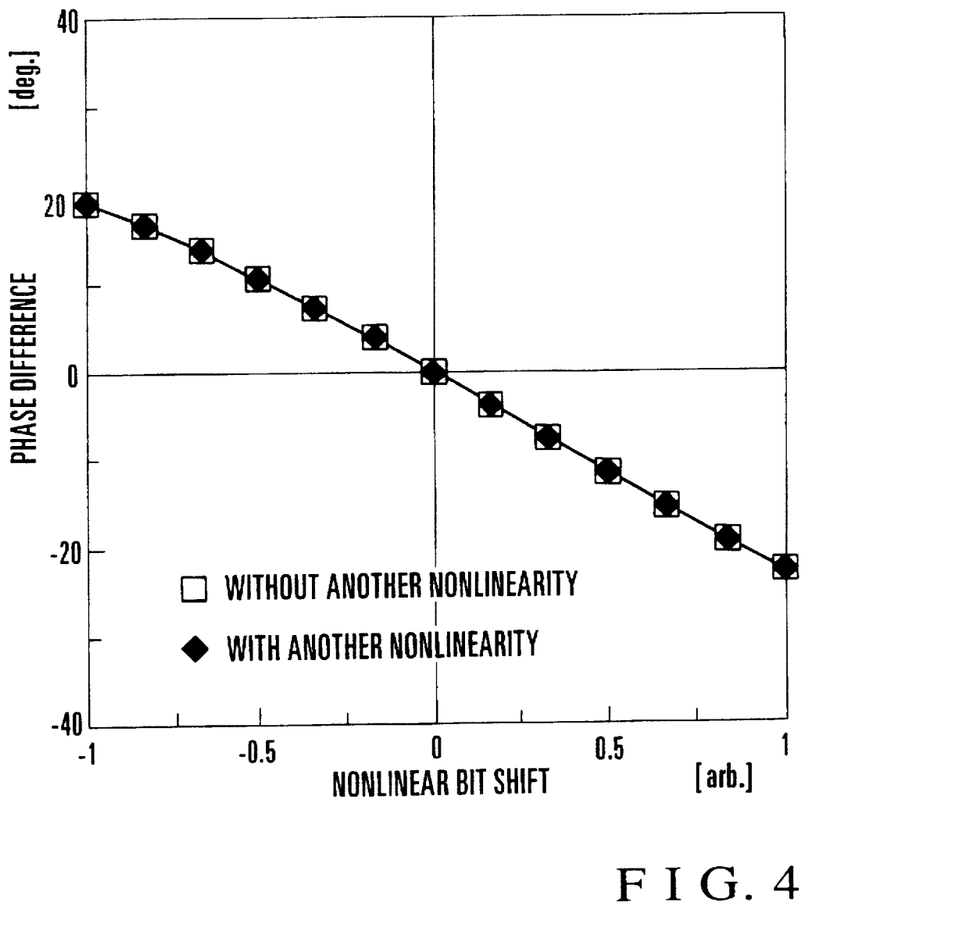
FIG. 4 is a graph showing the relationship between the nonlinear bit shift and the phase difference between four times harmonic components of composite and isolated data patterns.

The positive sign of the nonlinear bit shift in FIG. 3 or 4 indicates a direction in which the succeeding bit approaches the preceding bit, and the negative sign indicates a direction in which the succeeding bit becomes more removed from the preceding bit. The magnitude of the nonlinear bit shift is normalized using the bit length of the adjacent bit pair as 1.

Other nonlinearity indicates nonlinearity other than the nonlinear bit shift, such as asymmetry in an amplitude or half-width value, or a hard transient shift. To increase the amplitudes of the harmonic components in multiples of 2 (harmonics of even-numbered orders), extract phase differences with high precision, and improve calculation of nonlinear bit shifts, about 10% asymmetry in amplitudes is kept contained regardless of the presence/absence of another nonlinearity except for the nonlinear bit shift.

As is be apparent from FIGS. 3 and 4, the phase differences between the harmonic components of the composite and isolated data patterns change almost in proportion to the nonlinear bit shifts. The phase differences are left almost unchanged regardless of the presence/absence of another nonlinearity except for the nonlinear bit shift. It is also found that the phase difference without any nonlinear bit shift for the harmonic component twice the fundamental frequency is 180° from FIG. 3, and that the phase difference without any nonlinear bit shift for the harmonic component four times the fundamental frequency is 0° from FIG. 4.

This will be examined more in detail. The phase difference between the composite and isolated data patterns without any nonlinear bit shift for the harmonic component having the frequency 4N (N=1, 2, or 3) times the fundamental frequency becomes 0°, and the phase difference between the composite and isolated data patterns with a nonlinear bit shift for the harmonic component having the frequency 4N−2 (N=1, 2, or 3) times the fundamental frequency becomes 180°.

The phase differences between the composite and isolated data patterns without a nonlinear bit shift for the harmonic components 4N−1 (N=1, 2, or 3) and 4N−3 (N=1, 2, or 3) times the fundamental frequency become 0°, and the phase difference between the composite and isolated data patterns with a nonlinear bit shift does not change in proportion to the nonlinear bit shift.

Using the magnetic recording apparatus according to the present invention, the magnitude and direction of a nonlinear bit pattern can be easily measured in accordance with the phase difference between the harmonic components in multiples of two of the fundamental frequency of the composite and isolated data patterns.

IV. Relationship Between Amplitude and Nonlinear Bit Shift

Figure 5:
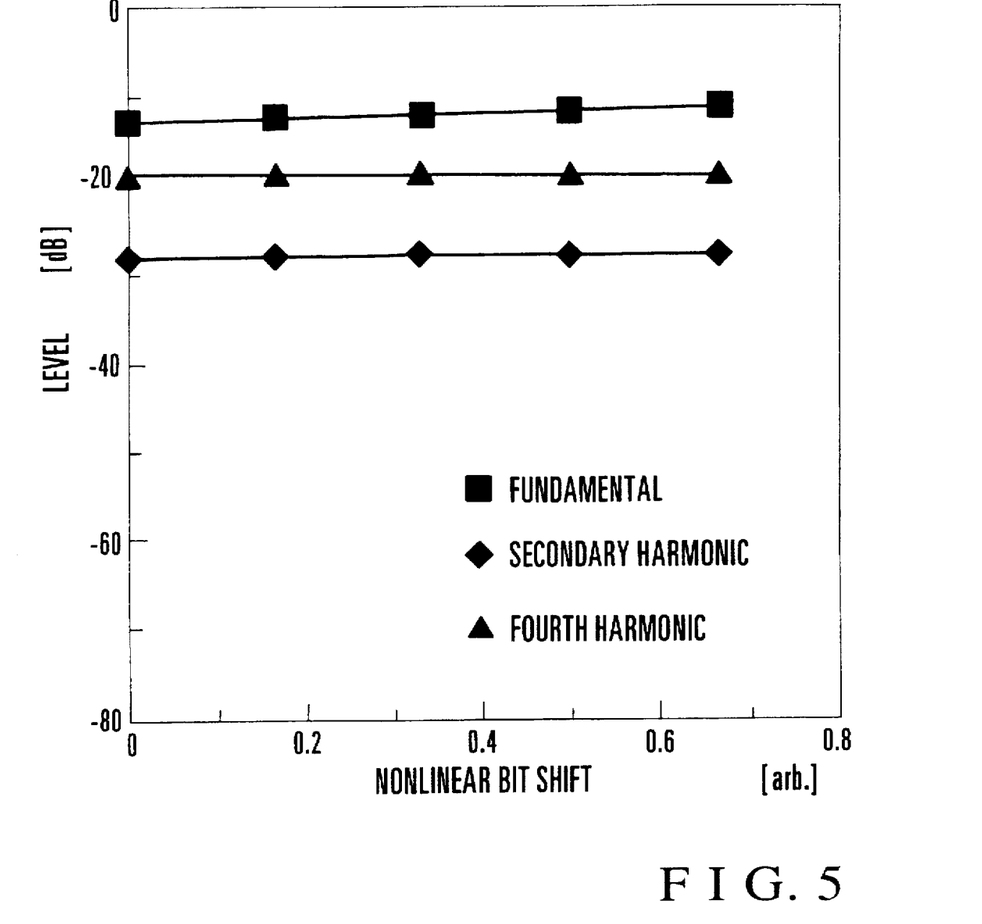
FIG. 5 is a graph showing the relationship between the nonlinear bit shift and the amplitude of a composite data pattern with another nonlinearity.

An example of the relationship between the nonlinear bit shift and the amplitude of the harmonic component of the composite data pattern will be described below. FIG. 5 shows a case with another nonlinearity, and FIG. 6 shows a case without another nonlinearity.

Figure 6:
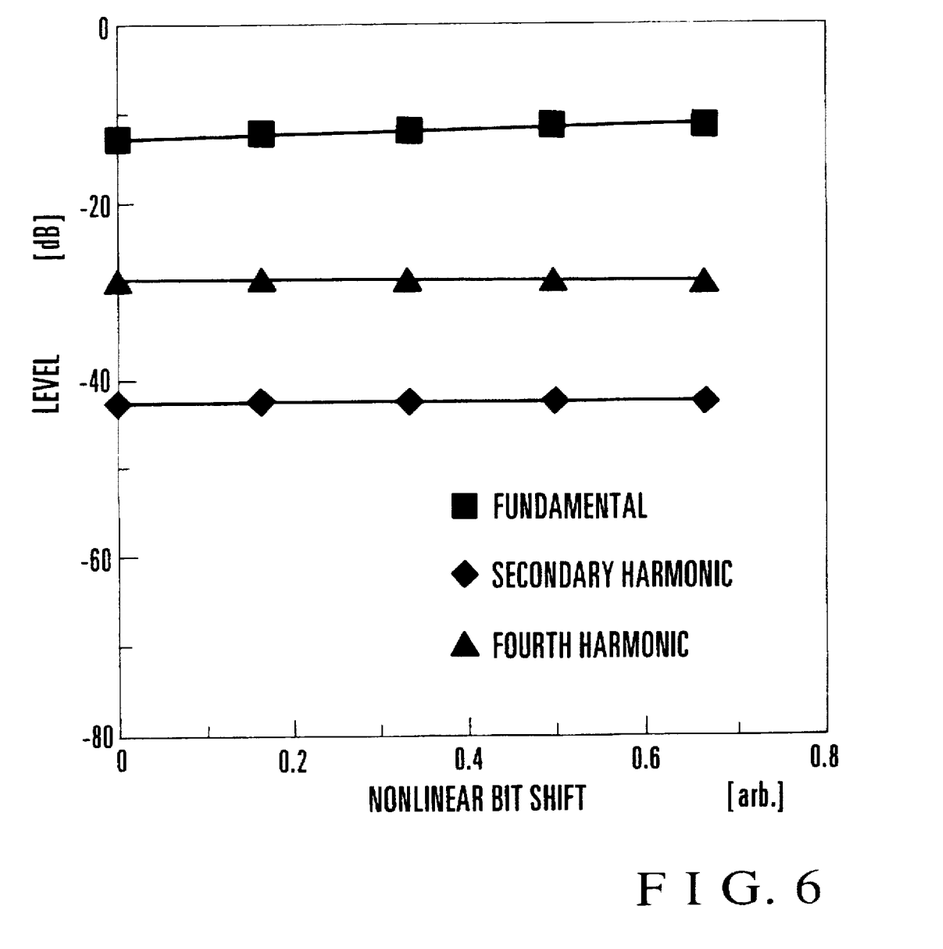
FIG. 6 is a graph showing the relationship between the nonlinear bit shift and the amplitude of a composite data pattern without another nonlinearity.

Judging from FIGS. 5 and 6, the amplitudes of the harmonic components twice and four times the fundamental frequency of the composite data pattern are kept almost unchanged regardless of the presence/absence of the nonlinear bit shifts.

Even if a nonlinear bit shift becomes small, the amplitudes of the harmonic components in the multiples of two of the fundamental frequency do not become small. A small nonlinear bit shift can thus be properly measured.

V. Measurement and Compensation of Nonlinear Bit Shift

The measurement and compensation operations of nonlinear bit shifts will be described below according to the present invention.

The bit length of the adjacent bit pair 201 of the composite data pattern shown in FIG. 2A is given as a bit length for measuring the influence of a nonlinear bit shift. Composite and isolated data patterns generated by the generator 101 are written on the magnetic recording surface 100 by the write unit 102. The phases of harmonic components 4N−2 (N=1, 2, or 3) and 4N (N=1, 2, or 3) times the fundamental frequency of the composite and isolated data patterns read out by the read unit 103 are measured by the filter 112 and the phase detector 104.

When the processor 105 and the harmonic components 4N (N=1, 2, or 3) times the fundamental frequency are used, the processor 107 determines a nonlinear bit shift compensation factor by equation (1) using the phase difference between the harmonic components. When the harmonic components 4N−2 (N=1, 2, or 3) times the fundamental frequency are used, the processor 108 determines a nonlinear bit shift compensation factor by equation (2) using the phase difference between the harmonic components.

The nonlinear bit shift can be measured by the above procedures.

The controller 111 controls the compensator 110 so as to shift the data pulse position of the composite data pattern by a known amount in a direction to reduce the determined nonlinear bit shift compensation factor. This nonlinear bit shift compensation factor, i.e., the nonlinear bit shift compensation factor before compensation is stored in the memory 109. In the same procedures as described above, the phase difference between the harmonic components 4N−2 (N=1, 2, or 3) or 4N (N=1, 2, or 3) times the fundamental frequency of the composite and isolated data patterns is measured. The measured nonlinear bit shift compensation factor is compared with the nonlinear bit shift compensation factor stored in the memory 109. Nonlinear bit shift compensation factors are repeatedly stored, measured, and compared until the nonlinear bit shift compensation factor becomes minimum.

By the above procedures, the nonlinear bit shift can be effectively compensated.

The asymmetry of the amplitudes of the composite and isolated data patterns read out by the read unit 103 is changed by a known amount by the changing unit 106. The amplitudes of the harmonic components in the multiples of two (harmonics of even-numbered orders) are increased, phase difference can be extracted with high precision, and calculation of nonlinear bit shifts can be improved. Since the data patterns are nonsensitive to nonlinearity other than the nonlinear bit shift, only the nonlinear bit shift is extracted from another nonlinearity such as asymmetry in amplitudes.

As described above, the magnetic recording apparatus of this embodiment is based on the use of two data patterns, i.e., a composite data pattern and an isolated data pattern having the same fundamental frequency. In writing these two data patterns without any nonlinear bit shift, predetermined harmonic components have no phase difference or opposite phases. When a data pulse position is shifted by a nonlinear bit shift, a phase difference occurs between the predetermined harmonic components of the two data patterns which had no phase difference or had opposite phases without any nonlinear bit shift. In particular, the phase difference between the harmonic components 4N (N=1, 2, or 3) and 4N−2 (N=1, 2, or 3) times the fundamental frequency changes almost in proportion to the nonlinear bit shift. The value of the phase difference between these harmonic components represents the magnitude of the nonlinear bit shift, and the sign of the phase difference represents the direction of the nonlinear bit shift.

The amplitudes of the two data patterns are left almost unchanged regardless of the presence/absence of a nonlinear bit shift. Even if a nonlinear bit shift is small, the amplitudes of the predetermined harmonic components are rarely reduced. A small nonlinear bit shift can be properly measured. In addition, these data patterns are insensitive to nonlinearity other than the nonlinear bit shift. Therefore, only the nonlinear bit shift is extracted from other nonlinearity.

In the above embodiment, the compensated nonlinear bit shift compensation factor obtained by the processor 105 is compared with the nonlinear bit shift compensation factor stored in the memory 109, and the shift operation of the compensator 110 is controlled to minimize the nonlinear bit shift compensation factor. However, the shift operation of the compensator 110 may be controlled on the basis of the nonlinear bit shift compensation factor stored in the memory 109.

As has been described above, in the magnetic recording apparatus according to the present invention, the magnitude and direction of a nonlinear bit shift can be properly measured even if the nonlinear bit shift is reduced. The influence of the nonlinear bit shift can be compensated for in accordance with the measurement result of the nonlinear bit shift.

What is claimed is:

1. A magnetic recording apparatus comprising:
   generation means for generating a composite data pattern of a basic period having a central adjacent bit pair between isolated bits and an isolated data pattern having the same basic period as that of the composite data pattern and only an isolated bit;
   writing means for writing the composite and isolated data patterns generated by said generation means on a magnetic recording medium;
   reading means for reading out the composite and isolated data patterns written on said magnetic recording medium;
   detection means for detecting phases of frequency components of the composite and isolated data patterns read out by said reading means; and
   processing means for converting a difference between the phases of the frequency components of the composite and isolated data patterns, detected by said detection means, into a nonlinear bit shift compensation factor.

2. An apparatus according to claim 1, further comprising changing means for changing, by a known amount, an asymmetry in amplitudes of the composite and isolated data patterns read out by said reading means, and outputting a changed asymmetry to said detection means.

3. An apparatus according to claim 1, wherein said processing means comprises a processor for converting a phase difference between frequency components of the composite and isolated data patterns into a nonlinear bit shift compensation factor $\Phi(4N)$ by the following equation using phases of harmonic components $4N$ ($N=1, 2,$ or $3$) times the fundamental frequency of the composite and isolated data patterns which are measured by said detection means:

$$\Phi(4N)=\Psi(4N)-\Theta(4N)$$

where $\Psi(4N)$ is the phase of a harmonic having a frequency $4N$ times the fundamental frequency of the composite data pattern, and $\Theta(4N)$ is the phase of a harmonic having a frequency $4N$ times the fundamental frequency of the isolated data pattern.

4. An apparatus according to claim 3, further comprising filter means for extracting a frequency in multiples of two of the fundamental frequency as a frequency component of the composite and isolated data patterns read out by said reading means, and outputting an extracted frequency component to said detection means.

5. An apparatus according to claim 1, wherein said processing means comprises a processor for converting a phase difference between frequency components of the composite and isolated data patterns into a nonlinear bit shift compensation factor $\Phi(4N-2)$ by the following equation using phases of harmonic components $4N-2$ ($N=1, 2,$ or $3$) times the fundamental frequency of the composite and isolated data patterns which are measured by said detection means:

$$\Phi(4N-2)=\Psi(4N-2)-\Theta(4N-2)\pm 180$$

whereupon $\Psi(4N-2)$ is the phase of harmonic having a frequency $4N-2$ times the fundamental frequency of the composite data pattern, and $\Theta(4N-2)$ is the phase of a harmonic having a frequency $4N-2$ times the fundamental frequency of the isolated data pattern.

6. An apparatus according to claim 5, further comprising filter means for extracting a frequency component in multiples of two of the fundamental frequency as a frequency component of the composite and isolated data patterns read out by said reading means, and outputting an extracted frequency component to said detection means.

7. An apparatus according to claim 1, further comprising:
   compensation means for shifting a position of data pulse of the composite data pattern generated by said generation means by a known amount and outputting a shifted data pulse;
   memory means for updating and storing the nonlinear bit shift compensation factor obtained by said processing means; and
   control means for comparing the nonlinear bit shift compensation factor compensated by said processing means with the nonlinear bit shift compensation factor stored in said memory means, and controlling a shift operation of said compensation means so as to minimize the nonlinear bit shift compensation factor, and
   wherein said processing means repeatedly obtains the compensated nonlinear bit shift factor every time the nonlinear bit shift is compensated by said compensation means.

8. An apparatus according to claim 1, further comprising
   compensation means for shifting a position of data pulse of the composite data pattern by a known amount and outputting a shifted data pulse;
   memory means for updating and storing the nonlinear bit shift compensation factor obtained by said processing means; and
   control means for controlling a shift operation of said compensation means on the basis of the nonlinear bit shift compensation factor stored in said memory means, and wherein said processing means repeatedly obtains the compensated nonlinear bit shift factor every time the nonlinear bit shift is compensated by said compensation means.

* * * * *

UNITED STATES PATENT AND TRADEMARK OFFICE
CERTIFICATE OF CORRECTION

PATENT NO.   :   5,781,358
DATED        :   July 14, 1998
INVENTOR(S)  :   Toshiyuki Hasegawa It is certified that error appears in the above-identified patent and that said Letters Patent is hereby corrected as shown below:

Claim 4, Col. 7, line 54, please insert --component-- after "frequency"

Signed and Sealed this

Twentieth Day of October, 1998

Attest:

BRUCE LEHMAN

*Attesting Officer*  *Commissioner of Patents and Trademarks*